United States Patent
Suzuki et al.

(10) Patent No.: US 11,431,031 B2
(45) Date of Patent: Aug. 30, 2022

(54) ALL-SOLID-STATE BATTERY

(71) Applicant: TOYOTA JIDOSHA KABUSHIKI KAISHA, Toyota (JP)

(72) Inventors: Tomoya Suzuki, Susono (JP); Shigetada Sugiyama, Toyota (JP); Yoshihide Enomoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 53 days.

(21) Appl. No.: 16/369,183

(22) Filed: Mar. 29, 2019

(65) Prior Publication Data

US 2019/0326645 A1 Oct. 24, 2019

(30) Foreign Application Priority Data

Apr. 18, 2018 (JP) .............................. JP2018-079960

(51) Int. Cl.
*H01M 10/0585* (2010.01)
*H01M 4/02* (2006.01)

(52) U.S. Cl.
CPC .. *H01M 10/0585* (2013.01); *H01M 2004/025* (2013.01)

(58) Field of Classification Search
CPC ....... H01M 10/0585; H01M 2004/025; H01M 10/0562
See application file for complete search history.

(56) References Cited

U.S. PATENT DOCUMENTS

| | | | |
|---|---|---|---|
| 5,486,433 A | 1/1996 | Glaser | |
| 9,399,404 B2 | 7/2016 | Ose et al. | |
| 2008/0020271 A1 | 1/2008 | Sato et al. | |
| 2010/0003598 A1* | 1/2010 | Nakamura | H01G 11/26 429/209 |
| 2010/0075217 A1* | 3/2010 | Yamamoto | H01M 4/134 429/152 |
| 2015/0134172 A1 | 5/2015 | Ose et al. | |

(Continued)

FOREIGN PATENT DOCUMENTS

| | | |
|---|---|---|
| EP | 3039738 | 7/2016 |
| JP | H06-260165 A | 9/1994 |
| JP | 2005011660 A * | 1/2005 |

(Continued)

OTHER PUBLICATIONS

JP2005011660A Original and Translation from Espacenet (Year: 2005).*
JP 2008103284 A Translation from Espacenet (Year: 2008).*

*Primary Examiner* — Nathanael T Zemui
(74) *Attorney, Agent, or Firm* — Oliff PLC

(57) ABSTRACT

An all-solid-state battery configured to suppress capacity degradation. The all-solid-state battery may comprise a stack of a cathode layer, a solid electrolyte layer and an alloy-based anode layer, and a confining structure confining the stack in an approximately parallel direction to a stacking direction, wherein the cathode layer has a cathode plane on a side facing the solid electrolyte layer; wherein the alloy-based anode layer has an anode plane on a side facing the solid electrolyte layer; wherein the cathode plane and anode plane of the stack have a long axis direction and a short axis direction; and wherein at least one of the cathode plane and the anode plane has one or more slit channels.

7 Claims, 2 Drawing Sheets

(56) References Cited

U.S. PATENT DOCUMENTS

2016/0013469 A1* 1/2016 Tajima .................. H01M 4/13
    429/127

FOREIGN PATENT DOCUMENTS

| JP | 2006-120445 | A  | 5/2006 |
|----|-------------|----|--------|
| JP | 2008-103284 | A  | 5/2008 |
| JP | 2010-086717 | A  | 4/2010 |
| JP | 2014-086218 | A  | 5/2014 |
| JP | 2015-095281 | A  | 5/2015 |
| WO | 2015/073095 | A2 | 5/2015 |
| WO | 2018/004227 | A1 | 1/2018 |

* cited by examiner

ALL-SOLID-STATE BATTERY

TECHNICAL FIELD

The disclosure relates to an all-solid-state battery.

BACKGROUND

An active material (an alloy-based active material) containing a metal that can form an alloy with Li (such as Si) has a large theoretical capacity per volume, compared to a carbon-based anode active material. Accordingly, an all-solid-state battery using such an alloy-based active material in the anode, has been proposed.

Patent Literature 1 discloses an all-solid-state battery comprising a cathode, a solid electrolyte and an anode that contains an alloy-based active material, and an all-solid-state battery system that limits an anode volume change between charging and discharging the battery to 2.2 times or less.

Patent Literature 1: Japanese Patent Application Laid-Open No. 2014-86218

However, the all-solid-state battery system as disclosed in Patent Literature 1 in which the alloy-based active material is used as the anode active material, has the following problem: along with the anode volume change caused by charging and discharging the battery, mainly, a pressure distribution occurs in an electrode plane on the solid electrolyte-facing side of the anode (in an anode plane), and the width of the pressure distribution is large and results in capacity degradation.

SUMMARY

In light of the above circumstance, an object of the disclosed embodiments is to provide an all-solid-state battery configured to suppress capacity degradation.

In a first embodiment, there is provided an all-solid-state battery, comprising a stack of a cathode layer, a solid electrolyte layer and an alloy-based anode layer, and a confining structure confining the stack in an approximately parallel direction to a stacking direction, wherein the cathode layer has a cathode plane on a side facing the solid electrolyte layer; wherein the alloy-based anode layer has an anode plane on a side facing the solid electrolyte layer; wherein the cathode plane and anode plane of the stack have a long axis direction and a short axis direction; and wherein at least one of the cathode plane and the anode plane has one or more slit channels.

At least one of the cathode plane and the anode plane may be divided into two or more regions by the one or more slit channels, and a value obtained by dividing a longest diameter of at least one of the two or more regions by a width thereof, which is perpendicular to the longest diameter, may be from 1 to 3.

A shape of at least one of the two or more regions may be a square, rectangular or circular shape.

Both the cathode plane and the anode plane may have the one or more slit channels, and the one or more slit channels of the cathode plane and the one or more slit channels of the anode plane may face each other.

According to the disclosed embodiments, since at least one of the cathode plane and the anode plane has one or more slit channels, the all-solid-state battery of the disclosed embodiments can decrease the pressure distribution width of at least one of the cathode plane and the anode plane more than conventional all-solid-state batteries, and it can suppress capacity degradation more than conventional all-solid-state batteries, therefore.

BRIEF DESCRIPTION OF THE DRAWINGS

In the accompanying drawings.

DETAILED DESCRIPTION

The all-solid-state battery according to the disclosed embodiments is an all-solid-state battery, comprising a stack of a cathode layer, a solid electrolyte layer and an alloy-based anode layer, and a confining structure confining the stack in an approximately parallel direction to a stacking direction, wherein the cathode layer has a cathode plane on a side facing the solid electrolyte layer; wherein the alloy-based anode layer has an anode plane on a side facing the solid electrolyte layer; wherein the cathode plane and anode plane of the stack have a long axis direction and a short axis direction; and wherein at least one of the cathode plane and the anode plane has one or more slit channels.

When a metal that can form an alloy with Li (hereinafter, the metal may be referred to as M) is used as an anode active material in an all-solid-state battery, along with charging the all-solid-state battery, a so-called electrochemical alloying reaction as represented by the following chemical formula (A) occurs in the anode:

$$x\text{Li}^+ + xe^- + y\text{M} \rightarrow \text{Li}_x\text{M}_y \quad \text{Formula (A)}$$

Along with discharging the all-solid-state battery, as shown by the following formula (B), an extraction reaction of Li ions from the Li-M alloy occurs in the anode:

$$\text{Li}_x\text{M}_y \rightarrow x\text{Li}^+ + xe^- + y\text{M} \quad \text{Formula (B)}$$

The all-solid-state battery using the metal that can form an alloy with Li as the anode active material, undergoes a large volume change along with the Li insertion/extraction reactions represented by the formulae (A) and (B).

In Patent Literature 1, it is described that when the anode volume change (obtained by dividing the anode volume after charging by the anode volume before charging) is 2.2 times or less, the capacity degradation rate per charge-discharge cycle of the all-solid-state battery including the anode, is 0%.

However, it was found that in the case of the battery that undergoes a large volume change by charging and discharging (such as the above-mentioned all-solid-state battery), even if a confining pressure is uniformly applied in the plane direction of the battery during initial charging and discharging, a pressure distribution may occur in the anode plane by anode expansion during charging (see the above formula (A)) and may cause an electrode reaction distribution and a decrease in battery performance.

Figure 9:
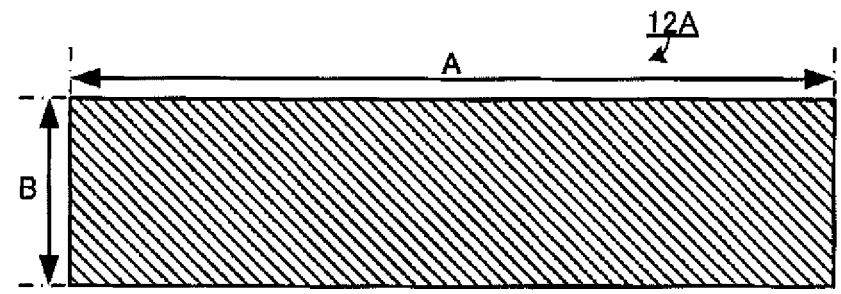
FIG. 9 is a schematic plan view of an electrode plane in a conventional all-solid-state battery.

Hereinafter, an estimated mechanism thereof will be explained with reference to FIG. 9. FIG. 9 is a schematic plan view of an electrode plane in a conventional all-solid-state battery.

Since it is difficult for the central part of the anode plane of the battery to expand to the anode plane direction during battery charging, the central part expands in the vertical direction to the plane direction (that is, the parallel direction to the stacking direction of the battery members). Therefore, high pressure is applied to the central part of the anode plane during battery charging. On the other hand, during battery charging, the periphery of the anode plane can expand to the outside in the plane direction of the anode plane. Therefore, low pressure is applied to the periphery of the anode plane during battery charging. As just described, since the applied pressure varies among the sections of the anode plane, a pressure distribution occurs in the anode plane. Such a pressure distribution is caused since the battery is almost composed of solid materials. That is, it is thought that the occurrence of such a pressure distribution is a problem peculiar to all-solid-state batteries.

As shown in FIG. 9, an electrode plane 12A of the conventional all-solid-state battery has a long axis direction length A and a short axis direction length B. In the all-solid-state battery comprising a stack that includes the electrode plane in such a narrow and long shape, as will be shown in the below-described Comparative Reference Example 1 and FIG. 8, a pressure distribution width between the central part of the electrode plane and the periphery thereof, is large.

The all-solid-state battery of the disclosed embodiments can decrease the pressure distribution width of the electrode plane more than conventional all-solid-state batteries, by disposing one or more slit channels in at least one of the cathode plane and the anode plane. Therefore, it is thought that the all-solid-state battery of the disclosed embodiments can suppress capacity degradation more than conventional all-solid-state batteries.

Hereinafter, the all-solid-state battery of the disclosed embodiments will be described in detail.

1. Cathode Layer and Alloy-Based Anode Layer (1) Similarities

Hereinafter, similarities between the cathode layer and alloy-based anode layer of the disclosed embodiments (hereinafter they may be collectively referred to ac "electrode layer") will be described.

The cathode layer has the cathode plane on the side facing the below-described solid electrolyte layer. The alloy-based anode layer has the anode plane on the side facing the solid electrolyte layer. In addition, at least one of the cathode plane and the anode plane (hereinafter they may be collectively referred to as "electrode plane") has one or more slit channels. A main characteristic of the all-solid-state battery of the disclosed embodiments is that the all-solid-state battery comprises the electrode plane having the one or more slit channels.

Figure 1:
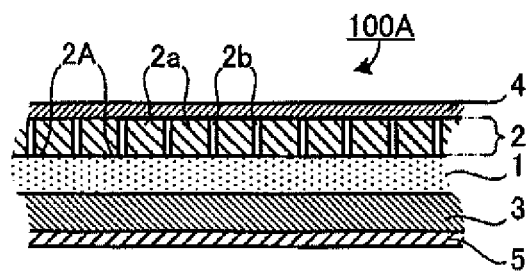
FIG. 1 is a view of a first example of the layer structure of the all-solid-state battery according to the disclosed embodiments and it is also a schematic sectional view of the all-solid-state battery cut in the stacking direction.

FIG. 1 is a view of a first example of the layer structure of the all-solid-state battery according to the disclosed embodiments, and it is also a schematic sectional view of the all-solid-state battery cut in the stacking direction. An all-solid-state battery 100A, which is the first embodiment, comprises a stack of a solid electrolyte layer 1, a cathode layer 2 and an alloy-based anode layer 3. The all-solid-state battery 100A further comprises a cathode current collector 4 on one side of the stack and an anode current collector 5 on the other side of the stack. As shown in FIG. 1, the cathode layer 2 and the cathode current collector 4 are present in this order on one side of the solid electrolyte layer 1, and the alloy-based anode layer 3 and the anode current collector 5 are present in this order on the other side of the solid electrolyte layer 1. FIG. 1 and the below-described FIGS. 2 to 6 are schematic views for the purpose of illustration. The thickness, shape and area of the layers and the width and shape of the slit channels shown in the figures are not restricted by those shown in the figure.

As shown in FIG. 1, the cathode layer 2 of the all-solid-state battery 100A has cathode cells 2a and slit channels 2b. In the disclosed embodiments, like the cathode layer 2 shown in FIG. 1, a section where the same kind of material (or mixture) is present in a given thickness in the approximately parallel direction to the plane direction of the battery, will be considered as one layer, regardless of whether the section is a section where the material is continuously or intermittently present.

As shown in FIG. 1, the slit channels 2b absolutely separate the adjacent cathode cells 2a to provide sections where there is an absence of the cathode cells 2a (that is, sections where there is an absence of a cathode active material) between the cathode current collector 4 and the solid electrolyte layer 1. As a result, the alloy-based anode layer 3 is divided into sections facing the cathode cells 2a and sections facing the slit channels 2b. Given that a lithium source is contained in the cathode cells 2a, during charging, the lithium transfer distance along the stacking direction of the all-solid-state battery 100A, is more important than the lithium transfer distance along the plane direction of the all-solid-state battery 100A, in considering the design of lithium transfer paths. Therefore, it is possible to think that the sections of the alloy-based anode layer 3 receive lithium from the cathode cells 2a facing the sections. Therefore, during charging the all-solid-state battery 100A, the sections that receive lithium conducted from the cathode cells 2a and the sections that receive no lithium, coexist in the alloy-based anode layer 3 facing the cathode cells 2a.

As just described, the sections that receive lithium from the cathode cells 2a and expand, and the sections that receive no lithium and rarely cause a volume change, coexist in the alloy-based anode layer 3 during charging. Therefore, the all-solid-state battery can decrease the pressure distribution width of the electrode plane more than conventional all-solid-state batteries, and the battery can suppress capacity degradation more than conventional all-solid-state batteries, therefore.

As shown in FIG. 1, when the cathode plane 2A is observed from the approximately vertical direction to the stacking direction of the stack and from the approximately parallel direction to the extending direction of the slit channels, the sectional form of the slit channels is not particularly limited. As described above, the reason the slit channels 2b are disposed in the cathode layer 2, is that the sections that receive no lithium are provided in the alloy-based anode layer 3 facing the cathode layer 2, by disposing the sections where the cathode active material is not present in the cathode layer 2. Therefore, the channels may be formed so as to obtain a predetermined width of at least the cathode plane 2A, and the sectional shape of the channels is not particularly limited.

From the above viewpoint, the sectional shape of the slit channels may be a wedge shape or a rectangular shape, for example. The sectional shape may be a rectangular shape.

Figure 2:
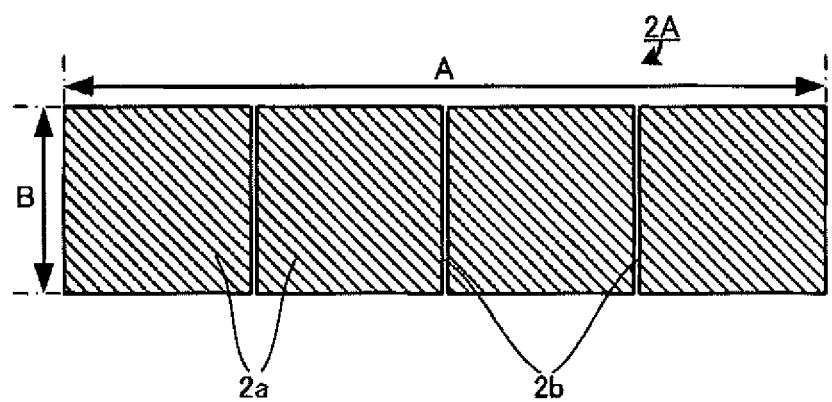
FIG. 2 is a schematic plan view of an example of the cathode plane of the all-solid-state battery according to the disclosed embodiments.

FIG. 2 is a schematic plan view of an example of the cathode plane 2A of the all-solid-state battery according to the disclosed embodiments. FIG. 2 corresponds to a figure of the cathode plane 2A of FIG. 1, which is observed in a direction starting from the solid electrolyte layer 1 to the cathode current collector 4. For ease of illustration and explanation, the ratio of the width of the cathode cells 2a to the width of the slit channels 2b appear differently between FIG. 1 and FIG. 2. In addition, for ease of illustration and explanation, FIG. 2 shows such an embodiment that four cathode cells 2a are arranged in a raw.

FIG. 2 shows that in the electrode plane 2A having the long axis direction length A and a short axis direction length B, the four cathode cells 2a are arranged to sandwich the slit channels 2b. Since the cathode cells 2a are independently present, as described above, the sections that receive lithium from the cathode cells 2a and expand during charging, and the sections that receive no lithium and rarely cause a volume change during charging, can be provided in the anode facing the cathode cells 2a.

As shown in FIG. 2, when the cathode plane 2A is observed from the approximately parallel direction to the stacking direction of the stack, the plan-view shape of the slit channels is not particularly limited. As described above, the slit channels may be in any shape, as long as the cathode cells 2a can be almost absolutely separated, and the cathode cells are less likely to be brought into contact with each other, during charging and discharging. Therefore, the channels may be formed so that they can obtain at least a predetermined width and a predetermined area in the cathode plane 2A. The plan-view shape of the channels is not particularly limited.

From the above viewpoint, the sectional shape of the slit channels may be continuous and straight, may be continuous and curved, or may be continuous and meandering, for example.

Of them, as shown in FIG. 2, the sectional shape of the slit channels may be continuous and straight.

The width of the slit channels on the cathode plane may be larger than the thickness of the below-described solid electrolyte layer. As described above, during charging, the lithium transfer distance along the stacking direction of the all-solid-state battery is more important than the lithium transfer distance along the plane direction of the all-solid-state battery.

However, if the width of the slit channels is smaller than the thickness of the solid electrolyte layer, the lithium transfer distance along the plane direction of the all-solid-state battery becomes also important. As a result, the effect produced by disposing the slit channels, that is, the effect of decreasing the pressure distribution width of the electrode plane more than conventional all-solid-state batteries, may be small.

The area of the slit channels on the cathode plane is determined depending on the area of the anode sections on the anode plane, the sections facing the cathode cells. The area of the anode sections on the anode plane is basically proportional to the expansion amount of the anode. Accordingly, the area of the slit channels on the cathode plane can be obtained by calculating the expansion amount in advance.

Figure 3:
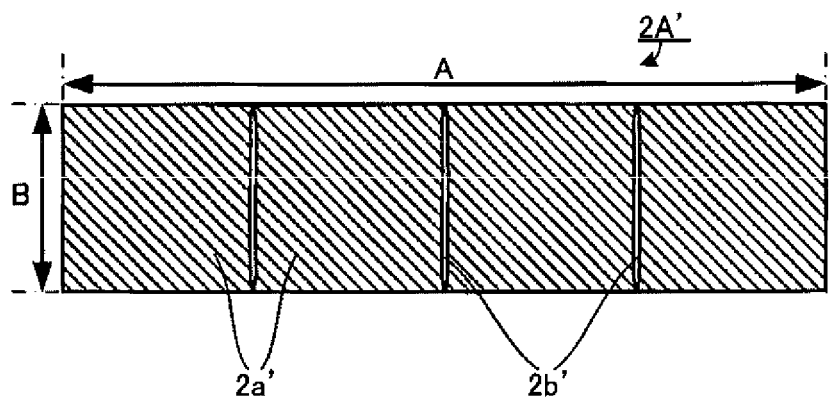
FIG. 3 is a schematic plan view of another example of the cathode plane of the all-solid-state battery according to the disclosed embodiments.

FIG. 3 is a schematic plan view of another example of the cathode plane of the all-solid-state battery according to the disclosed embodiments. A cathode plane 2A' shown in FIG. 3 is the same as the cathode plane 2A shown in FIG. 2, except for the plan-view shape of cathode cells 2a' and the plan-view shape of slit channels 2b'.

As shown in FIG. 3, the slit channels 2b' of the cathode plane 2A' have a predetermined width inside the cathode plane 2A'. Meanwhile, the width gradually decreases in the vicinity of the outer periphery of the cathode plane 2A'; the slit channels 2b' disappear at the outer periphery of the cathode plane 2A'; and the adjacent cathode cells 2a' are in contact at the outer periphery. As just described, the cathode cells 2a' need to be absolutely separated at the part which faces the inside of the anode and in which the expansion is most concentrated. However, the cathode cells 2a' may be in contact at the part which faces the outer periphery of the anode and from which pressure is easily released.

To form the slit channels in the cathode plane, a conventionally-known cathode layer forming method can be utilized. For example, the slit channels may be formed as follows: on one side of the solid electrolyte layer or cathode current collector, a continuous cathode plane is formed by use of a cathode mixture, and part of the cathode mixture on the cathode plane is removed, thereby forming the slit channels. Also, the slit channels may be formed as follows, for example: on one side of the solid electrolyte layer or cathode current collector, cathode cells are formed on by one, by use of the cathode mixture, and gaps between the cathode cells may be used as the slit channels.

The explanations about the cathode planes shown in FIGS. 1 and 2 apply to the anode plane. In the case of disposing the slit channels in the anode plane, as with the case of disposing the slit channels in the cathode plane, the role of the channels is to decrease the pressure distribution width of the electrode plane.

Hereinafter, an example will be described, in which the alloy-based anode layer has a lithium source before initial charging and discharging. In this case, during initial discharging, lithium is released from the alloy-based anode layer (see the above formula (B)) and received by the cathode layer. After the completion of initial discharging, the lithium-receiving sections of the cathode layer are those of the cathode layer facing the sections in which the lithium source was present of the alloy-based anode layer. On the other hand, the sections of the cathode layer which face the slit channels of the alloy-based anode layer, receive no lithium. As just described, after the completion of initial discharging, the sections that receive lithium conducted from the alloy-based anode layer and the sections that receive no lithium coexist in the cathode layer. During the subsequent initial charging, in the process of lithium transfer from the cathode layer to the alloy-based anode layer, the slit channels of the alloy-based anode layer receive no lithium, and other sections of the alloy-based anode layer receive lithium. As a result, the pressure distribution width of the anode plane can be decreased; the expansion and contraction of the alloy-based anode layer can be suppressed; and the all-solid-state battery of the disclosed embodiments can suppress capacity degradation more than conventional all-solid-state batteries.

In this case, it is thought that the below-described lithium deposition on the surface of the slit channels of the alloy-based anode layer (the interface between the channels and the solid electrolyte layer) is less likely to occur. The reason is as follows. Due to the lithium transfer from the alloy-based anode layer to the cathode layer during initial discharging, lithium conducting paths are formed between the alloy-based anode layer and the cathode layer, via the solid electrolyte layer. As a result, during initial charging, lithium transfers from the cathode layer to the alloy-based anode layer via the lithium conducting paths. Therefore, it is thought that the sections (excluding the slit channels) of the alloy-based anode layer receive almost all lithium, and the lithium deposition is less likely to occur on the surface of the slit channels of the alloy-based anode layer.

At least one of the cathode plane and the anode plane is divided into two or more regions by the one or more slit channels, and the value obtained by dividing the longest diameter of at least one of the two or more regions by the width thereof, which is perpendicular to the longest diameter, may be from 1 to 3, may be from 1 to 2, may be from 1 to 1.5, or may be 1.

The electrode plane of the stack used in the disclosed embodiments, has a long axis direction and a short axis direction. That is, the electrode plane of the stack has a shape that is long along a predetermined direction. It can be said that the electrode plane has a long axis direction length and a short axis direction length. As just described, for the stack whose plan-view shape is typically rectangle, as described above, pressure is concentrated at the central part of the electrode plane; meanwhile, pressure is released from the periphery of the electrode plane and, as a result, the pressure distribution width of the electrode plane increases. In the disclosed embodiments, therefore, the pressure distribution width of the electrode plane can be decreased by dividing the electrode plane into 2 or more regions by the above-described slit channel(s), the regions having the above-described predetermined ratio value.

As the value obtained by dividing the longest diameter of at least one of the two or more divided regions by the width thereof, which is perpendicular to the longest diameter (hereinafter, the value may be referred to as the aspect ratio of the divided region), gets closer to 1, the distance between the central part and periphery of the electrode plane is zero in some parts of the periphery, or the distance decreases. Accordingly, even in the case of expansion and contraction of the alloy-based anode layer, pressure is uniformly dispersed over the whole electrode plane and, as a result, the all-solid-state battery of the disclosed embodiments can decrease the pressure distribution width of the electrode plane more than conventional all-solid-state batteries.

In the disclosed embodiments, the aspect ratio of all of the divided regions may be from 1 to 3.

The upper limit of the aspect ratio of the divided regions relates to the maximum value of the pressure distribution width allowable in the electrode plane. When the maximum value of the pressure distribution width allowable in the electrode plane is large, the upper limit of the aspect ratio of the divided regions can be increased by that value. However, the maximum value of the pressure distribution width allowable in the electrode plane cannot be completely determined, since the maximum value depends on the materials contained in each electrode layer and the mixing ratio.

The shape of at least one of the two or more divided regions, may be a square, rectangular or circular shape. The divided regions may be in the same shape or different shapes. In considering the design of the electrode plane, the divided regions may be in the same shape. Depending on the shape of the slit channels, as shown by the plan-view shape of the cathode cells $2a'$ in FIG. 3, the shape of the divided regions may be slightly different from a square, rectangular or circular shape.

Of them, the shape of the divided regions may be a square or rectangular shape, from the viewpoint of design efficiency of the electrode plane and from the viewpoint of such an advantage that the shapes of the slit channels can be easily uniformed. In the case of considering the aspect ratio of the divided regions, the shape of the divided regions may be a square shape as shown by the cathode cells $2a$ in FIG. 2.

All of the divided regions may be in a square, rectangular or circular shape, may be in a square or rectangular shape, or may be in a square shape.

Hereinafter, other layer structures of the all-solid-state battery of the disclosed embodiments, will be described.

Figure 4:
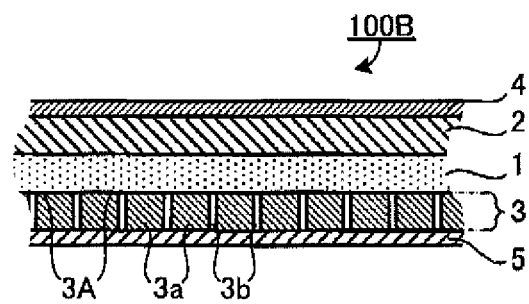
FIG. 4 is a view of a second example of the layer structure of the all-solid-state battery according to the disclosed embodiments, and it is also a schematic sectional view of the all-solid-state battery cut in the stacking direction.

FIG. 4 is a view of a second example of the layer structure of the all-solid-state battery according to the disclosed embodiments, and it is also a schematic sectional view of the all-solid-state battery cut in the stacking direction. An all-solid-state battery 100B, which is the second embodiment, is the same as the first embodiment (FIG. 1), except that slit channels $3b$ are disposed in the alloy-based anode layer 3, instead of not disposing slit channels in the cathode layer 2.

The slit channels $3b$ in the anode plane 3A of the alloy-based anode layer 3, can suppress the expansion and contraction of the whole alloy-based anode layer 3 and decrease the pressure distribution width of the anode plane, by absorbing a volume change of the anode cells $3a$ constituting the alloy-based anode layer 3.

Figure 5:
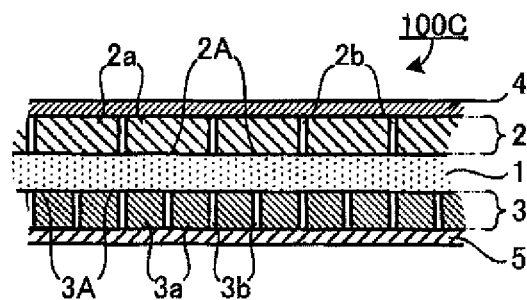
FIG. 5 is a view of a third example of the layer structure of the all-solid-state battery according to the disclosed embodiments, and it is also a schematic sectional view of the all-solid-state battery cut in the stacking direction.

FIG. 5 is a view of a third example of the layer structure of the all-solid-state battery according to the disclosed embodiments, and it is also a schematic sectional view of the all-solid-state battery cut in the stacking direction. An all-solid-state battery 100C, which is the third embodiment, is the same as the first embodiment (FIG. 1), except that slit channels are disposed in both the cathode layer 2 and the alloy-based anode layer 3. A lithium source (a substance containing lithium that is transferred between the electrode layers by charging and discharging) is contained in the alloy-based anode layer 3 of the all-solid-state battery 100C just after the production.

As shown in FIG. 5, the cathode plane 2A has the slit channels $2b$; the anode plane 3A has the slit channels $3b$; and part or all of the slit channels $2b$ and part or all of the slit channels $3b$ may face each other.

The reason the two types of slit channels face each other, is as follows. The sections where the slit channels are disposed, cannot receive lithium from the electrode layer facing the slit channels. Therefore, as described below, lithium may deposit on the surface of the slit channels (the interface between the channels and the solid electrolyte layer) especially during initial charging and discharging. In addition, since the two types of slit channels face each other, no lithium is transferred between the channels and, as a result, there is no possibility of lithium deposition. In addition, the sections where the slit channels are disposed are sections that cannot contribute to an electrode reaction. Therefore, by disposing the slit channels in the sections facing each other, the electrode plane can be efficiently designed, and a large electrode capacity can be obtained.

As shown in FIG. 5, the number of the slit channels contained in the alloy-based anode layer 3 is larger than the cathode layer 2, and the slit channels $3b$ include those not facing the slit channels $2b$. However, just after the production of the all-solid-state battery 100C, the lithium source was contained in the alloy-based anode layer 3. Since all of the slit channels $2b$ of the cathode layer 2 face the slit channels 3b, the cathode layer 2 facing the alloy-based anode layer 3, the lithium contained in the anode cells 3a transfers to the cathode cells 2a facing the anode cells 3a by initial discharging, and no lithium is deposited on the surface of the slit channels 2b (the interface between the channels 2b and the solid electrolyte layer 1).

Contrary to the all-solid-state battery 100C, when the lithium source is contained in the cathode layer 2 just after the production, due the same reason as above, the number of the slit channels contained in the cathode layer 2 may be larger than the alloy-based anode layer 3, and the slit channels 2b may include those not facing the slit channels 3b.

Hereinafter, the relationship between the position of the lithium source in the battery just after the production, and lithium deposition during initial charging and discharging, will be described.

For example, when the lithium source is contained in the alloy-based anode layer 3 of the battery just after the production, like the second embodiment (FIG. 4), the slit channels 3b may be disposed only in the alloy-based anode layers 3. When the lithium source is contained in the alloy-based anode layer 3 of the battery just after the production, like the third embodiment (FIG. 5), the number of the slit channels contained in the alloy-based anode layer 3 may be larger than the cathode layer 2, and the slit channels 3b may include those not facing the slit channels 2b. As described above concerning the third embodiment, in this case, the lithium contained in the anode cells 3a transfers to the cathode cells 2a facing the anode cells 3a by initial discharging, and no lithium is deposited on the surface of the slit channels 2b (the interface between the channels 2b and the solid electrolyte layer 1).

Contrary to this, when the lithium source is contained in the cathode layer 2 of the battery just after the production, like the first embodiment (FIG. 1), the slit channels 2b may be disposed only in the cathode layer 2. When the lithium source is contained in the cathode layer of the battery just after the production, the number of the slit channels contained in the cathode layer may be larger than the alloy-based anode layer, and the slit channels of the cathode layer may include those not facing the slit channels of the alloy-based anode layer. In this case, the lithium contained in the cathode cells transfers to the anode cells facing the cathode cells by initial charging, and no lithium is deposited on the surface of the slit channels of the anode cells (the interface between the channels and the solid electrolyte layer).

The area of the electrode cells on the electrode plane on the side that receives lithium during initial charging and discharging, may be designed larger than the area of the electrode cells on the electrode plane on the side that releases lithium during initial charging and discharging.

The above explanations are those mainly concerning the battery before and during initial charging and discharging. Once lithium transfers between the cathode layer and the alloy-based anode layer, lithium conducting paths are formed between the cathode layer and the alloy-based anode layer. Therefore, the cathode layer and the alloy-based anode layer exchange lithium through the lithium conducting paths.

As just described, by disposing the slit channels in the electrode layer containing the lithium source, the area of the section that is involved in an electrode reaction in the electrode plane of the electrode layer, can be appropriately controlled, and the slit channels can act as a buffer against the expansion and contraction of the electrode layer. Therefore, the expansion of the electrode layer can be suppressed.

(2) Cathode Layer

Hereinafter, the details of the cathode layer will be described.

The cathode layer is not particularly limited, as long as it functions as the cathode of the all-solid-state battery. In general, the cathode layer contains a Li-containing cathode active material. As needed, it contains other components such as a solid electrolyte, a binder and a conductive material.

In the disclosed embodiments, the cathode active material is not particularly limited, as long as it is an active material containing a Li element, etc. A substance which functions as a cathode active material in a battery chemical reaction in relation to an anode active material and which promotes a battery chemical reaction, can be used as the cathode active material, without particular limitations. A substance that has been known as a cathode active material for all-solid-state batteries, can be used in the disclosed embodiments.

The raw material for the cathode active material is not particularly limited, as long as it is a material that can be used in all-solid-state batteries.

As the raw material, examples include, but are not limited to, lithium cobaltate ($LiCoO_2$), lithium nickelate ($LiNiO_2$), lithium manganate ($LiMn_2O_4$), a different element-substituted Li—Mn spinel represented by the composition formula $Li_{1+x}Ni_{1/3}Mn_{1/3}Co_{1/3}O_2$ or $Li_{1+x}Mn_{2-x-y}M_yO_4$ (where M is one or more elements selected from Al, Mg, Co, Fe, Ni and Zn), lithium titanate ($Li_xTiO_y$) and lithium metal phosphate ($LiMPO_4$ where M is Fe, Mn, Co, Ni or the like).

The shape of the cathode active material is not particularly limited. It may be a film form or a particulate form.

The amount of the cathode active material in the cathode layer is not particularly limited. For example, it may be GO mass % or more, may be in a range of from 70 mass % to 95 mass %, or may be in a range of from 80 mass % to 90 mass %.

The solid electrolyte in the cathode layer may be a crystalline material or an amorphous material. The solid electrolyte is not particularly limited, as long as it is a solid electrolyte that can be used in all-solid-state batteries. The solid electrolyte may be an oxide-based amorphous solid electrolyte, a sulfide-based amorphous solid electrolyte, a crystalline oxide or nitride, etc., since they have high Li ion conductivity. For example, the solid electrolyte may be a glass such as a crystallized glass (glass ceramic).

As the oxide-based amorphous solid electrolyte, examples include, but are not limited to, $Li_2O$—$B_2O_3$—$P_2O_3$ and $Li_2O$—$SiO_2$. As the sulfide-based amorphous solid electrolyte, examples include, but are not limited to, $Li_2S$—$SiS_2$, $LiI$-$Li_2S$—$SiS_2$, $LiI$-$Li_2S$—$P_2S_5$, $LiI$-$Li_2S$—$P_2O_5$, $LiI$-$Li_3PO_4$—$P_2S_5$, $Li_2S$—$P_2S_5$, and $LiI$-$LiBr$-$Li_2S$—$P_2S_5$. As the crystalline oxide or nitride, examples include, but are not limited to, $LiI$, $Li_3N$, $Li_5La_3Ta_2O_{12}$, $Li_7La_3Zr_2O_{12}$, $Li_6BaLa_2Ta_2O_{12}$, $Li_3PO_{(4-3/2w)}N_w$ (w<1) and $Li_{3.6}Si_{0.6}P_{0.4}O_4$.

The cathode layer may contain a binder. As the binder, examples include, but are not limited to, polyvinylidene fluoride (PVdF), polytetrafluoroethylene (PTFE), butylene rubber (BR), styrene-butadiene rubber (SBR), polyvinyl butyral (PVB) and acrylic resin. The binder may be polyvinylidene fluoride (PVdF).

The cathode layer may contain a conductive material. The conductive material is not particularly limited, as long as it is a material that can be contained in the cathode layer and used in the all-solid-state battery. For example, the raw material for the conductive material may be at least one carbonaceous material selected from the group consisting of carbon black (such as Acetylene Black, Ketjen Black an furnace black), carbon nanotube and carbon nanofiber.

From the viewpoint of electron conductivity, the conductive material may be at least one carbonaceous material selected from the group consisting of carbon nanotube and carbon nanofiber. The carbon nanofiber and carbon nanotube may be vapor-grown carbon fiber (VGCF).

The average thickness of the cathode layer may be from 1 μm to 100 μm, or may be from 30 μm to 100 μm.

The average thickness of each of the layers constituting the all-solid-state battery of the disclosed embodiments, is a value obtained as follows: the thicknesses of 3 to 10 points of the target layer are measured with an electron microscope or the like, and the average of the measured results is used as the average thickness of the target layer.

For the all-solid-state battery of the disclosed embodiments, a cathode current collector may be disposed on the other side of the cathode layer to the below-described cathode plane.

As the cathode current collector, examples include, but are not limited to, SUS, Ni, Cr, Au, Pt, Al, Fe, Ti and Zn. These materials may be plated with Ni, Cr, C or the like, or Ni, Cr, C or the like may be evaporated on these materials.

(3) Alloy-Based Anode Layer

Hereinafter, the details of the alloy-based anode layer will be described.

The alloy-based anode layer contains at least an alloy-based anode active material. The alloy-based anode active material means an active material containing a metal that can form an alloy with Li.

The metal that can form an alloy with Li is not particularly limited, as long as it is a metal that can insert/extract Li ions along with so-called electrochemical alloying reactions represented by the formulae (A) and (B). As the metal element that can form an alloy with Li, examples include, but are not limited to, Mg, Ca, Al, Si, Ge, Sn, Pb, Sb and Bi. Of them, the metal element may be Si, Ge or Sn, or may be Si. In the disclosed embodiment, the word "metal" is used as a concept that encompasses "metal" and "semimetal", which are used for classification of general elements.

The alloy-based anode active material may contain an elemental Si.

The form of the metal that can form an alloy with Li, is not particularly limited. As the form, examples include, but are not limited to, a particulate form and a film form.

The alloy-based anode layer may contain a solid electrolyte. The solid electrolyte used in the alloy-based anode layer is not particularly limited, as long as it is a solid electrolyte that can be used in all-solid-state batteries. As with the solid electrolyte used in the cathode layer, the solid electrolyte used in the alloy-based anode layer may be an oxide-based amorphous solid electrolyte, a sulfide-based amorphous solid electrolyte, a crystalline oxide or nitride, etc.

As the raw material for the conductive material and the raw material for the binder, the same materials as those described above in "(2) Cathode layer" may be used.

The average thickness of the alloy-based anode layer may be from 1 μm to 100 μm, or it may be from 30 μm to 100 μm.

For the all-solid-state battery of the disclosed embodiments, an anode current collector may be disposed on the other side of the alloy-based anode layer to the below-described anode plane.

As the anode current collector, examples include, but are not limited to, copper and copper alloy. The copper may be plated with Ni, Cr, C or the like, or Ni, Cr, C or the like may be evaporated on the copper.

2. Solid Electrolyte Layer

The solid electrolyte layer is not particularly limited, as long as it functions as the solid electrolyte layer of all-solid-state batteries. In general, it contains a solid electrolyte. As needed, it contains other components such as a binder.

As the raw material for the solid electrolyte and the raw material for the binder, the same materials as those used in the cathode layer and/or the alloy-based anode layer may be used.

The average thickness of the solid electrolyte layer may be from 0.1 μm to 300 μm, or it may be from 0.1 μm to 100 μm.

As with the cathode layer and the alloy-based anode layer, slit channels may be disposed in the solid electrolyte layer.

Figure 6:
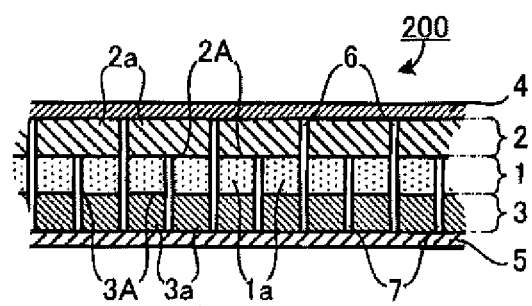
FIG. 6 is a view of a fourth example of the layer structure of the all-solid-state battery according to the disclosed embodiments, and it is also a schematic sectional view of the all-solid-state battery cut in the stacking direction.

FIG. 6 is a view of a fourth example of the layer structure of the all-solid-state battery according to the disclosed embodiments, and it is also a schematic sectional view of the all-solid-state battery cut in the stacking direction. The all-solid-state battery of the disclosed embodiments is not limited to the first to fourth embodiments. An all-solid-state battery 200, which is the fourth embodiment, is the same as the first embodiment (FIG. 1), except that the all-solid-state battery 200 has slit channels 6 and slit channels 7, the slit channels 6 penetrating the cathode layer 2, the solid electrolyte layer 1 and the alloy-based anode layer 3, and the slit channels 7 penetrating the solid electrolyte layer 1 and the alloy-based anode layer 3.

As described above, when slit channels are disposed in the sections of the cathode layer facing the sections of the alloy-based anode layer, or in the sections of the alloy-based anode layer facing the sections of the cathode layer, no lithium ion path is formed in a certain range including the sections, in the stacking direction, and the certain range is a section that is not involved in an electrode reaction. Therefore, there is no large difference in the performance of the all-solid-state battery between FIG. 5 (there is no slit channel in the solid electrolyte layer 1) and FIG. 6 (there are slit channels in the solid electrolyte layer 1). That is, the presence of the slit channels in the solid electrolyte layer 1 has no large influence on the performance of the all-solid-state battery.

3. Stack and Confining Structure

The all-solid-state battery of the disclosed embodiments comprises the confining structure confining the stack of the cathode layer, the solid electrolyte layer and the alloy-based anode layer in the approximately parallel direction to the stacking direction.

The confining structure is not particularly limited, as long as it is a structure that can confine the stack by a predetermined pressure. A typical example of the confining structure is confinement by a confining jig. A detailed confining method using the confining jig is not particularly limited. As the confining method, examples include, but are not limited to, a confining method using the confining torque of a bolt.

The confining direction may be the approximately parallel direction to the stacking direction. As used herein, the approximately parallel direction to the stacking direction may be such a direction that the adjacent layers of the stack are brought into sufficient contact with each other by the confining. In particular, the approximately parallel direction to the stacking direction may be a direction that makes an angle of 30 degrees or less with the stacking direction, a direction that makes an angle of 20 degrees or less with the stacking direction, a direction that makes an angle of 10 degrees or less with the stacking direction, or a direction parallel to the stacking direction.

When the pressure of the alloy-based anode layer before expansion and contraction is determined as 100%, a pressure change amount associated with the expansion and contraction of the alloy-based anode layer by charging and discharging the all-solid-state battery, may be 1,000% or less.

For the all-solid-state battery, the pressure change amount $\Delta P$ is more important than the pressure absolute value P associated with the expansion and contraction of the alloy-based anode layer. In general, the all-solid-state battery is confined under a predetermined pressure condition $P_0$ at first. Due to the expansion of the anode active material, the confining pressure is increased to pressure $P_1$ ($>P_0$) and a pressure distribution occurs in the electrode plane. As just described, the pressure distribution of the electrode plane occurs in association with the generation of the pressure change amount $\Delta P$ ($=P_1-P_0$).

In the case of employing a structure to confine the stack of the cathode layer, the solid electrolyte layer and the alloy-based anode layer without changing the size of the stack (i.e., a size-confining structure), the pressure change amount $\Delta P$ is highly likely to occur in association with charging and discharging. Therefore, the all-solid-state battery of the disclosed embodiments is especially effective when the size-confining structure is employed.

4. All-Solid-State Battery Production Method

The all-solid-state battery production method is not particularly limited, as long as it is a method by which the all-solid-state battery of the disclosed embodiment can be produced. For example, the all-solid-state battery of the disclosed embodiment can be obtained by disposing the solid electrolyte layer between the cathode mixture constituting the cathode layer and an alloy-based anode mixture constituting the alloy-based anode layer.

However, the production method may vary depending on whether the slit channels are disposed in the solid electrolyte layer or not.

For example, to produce the all-solid-state battery 100C as shown in FIG. 5, the battery comprising the solid electrolyte layer 1 having no slit channel, the following production method may be used: the cathode layer 2 having the slit channels 2b is formed on one side of the solid electrolyte layer 1; the alloy-based anode layer 3 having the slit channels 3b is formed on the other side of the solid electrolyte layer 1; and then the cathode current collector 4 and the anode current collector 5 are disposed thereon.

Meanwhile, for example, to produce the all-solid-state battery 200 as shown in FIG. 6, the battery comprising the solid electrolyte layer 1 having the slit channels 6 and 7, the following method may be used: the anode cells 3a, solid electrolyte cells 1a, and the cathode cells 2a are stacked in this order on the anode current collector 5, and the cathode current collector 4 is finally placed thereon. Also, to produce the all-solid-state battery 200, the following production method may be used: the alloy-based anode layer, the solid electrolyte layer and the cathode layer are stacked, and slits are finally disposed in two or three of the layers, at once.

EXAMPLES

Hereinafter, the disclosed embodiments will be further clarified by the following examples. The disclosed embodiments are not limited to the following examples, however.

1. Building a Model

Reference Example 1

Four square plates with a side of 6 cm were linearly aligned on one rectangular plate (long axis direction length: 26 cm, short axis direction length: 6 cm). Another rectangular plate (long axis direction length: 26 cm, short axis direction length: 6 cm) was placed on the four square plates so as to cover all of the four square plates, thereby building the model of Reference Example 1. At that time, gaps with a width of 0.5 cm were disposed between the square plates.

The gaps between the square plates are a simulation of the slit channels of the disclosed embodiments. The linearly-aligned four square plates disposed between the two rectangular plates and the gaps between the plates are a simulation of the electrode plane (cathode plane and/or anode plane) having the long axis direction length and the short axis direction length.

Comparative Reference Example 1

Three rectangular plates (long axis direction length: cm, short axis direction length: 6 cm) were stacked precisely, thereby building the model of Comparative Reference Example 1. The inner plate of the model is a simulation of a conventional electrode plane (cathode plane and/or anode plane) having a long axis direction length and a short axis direction length.

2. Simulation

The following simulation was carried out on the models of Reference Example 1 and Comparative Reference Example 1: a pressure of 10 MPa was uniformly applied to both sides of each model, in the parallel direction to the stacking direction. As a result, the four square plates to which a pressure of 10 MPa was entirely and uniformly applied and which had no pressure distribution (the four inner plates of Reference Example 1) and the rectangular plate to which a pressure of 10 MPa was entirely and uniformly applied and which had no pressure distribution (the inner plate of the model of Comparative Reference Example 1) were obtained. These plates are simulations of the confined electrode plane.

In addition, a thermal expansion simulation was carried out on the models to which the pressure was applied. A value when the plate(s), to which no pressure was applied, was isotropically thermally expanded in the plane direction (the X and Y directions) and the direction vertical to the plane direction (i.e., the Z direction) was set as the thermal expansion rate of each model. A heating temperature was set so that the thermal expansion rate simulated the thermal expansion rate of an alloy having a specific composition ratio and being contained in the anode of an all-solid-state battery. The outer plates of each model were deemed as a perfectly rigid body. The inner plate(s) of each model (i.e., plate(s) to be thermally expanded) was deemed as a plate(s) with no distortion or strain.

A simulation of the pressure distribution of the thermally-expanded inner plate(s) of each model, was carried out to make a pressure distribution graph.

3. Consideration

Figure 7:
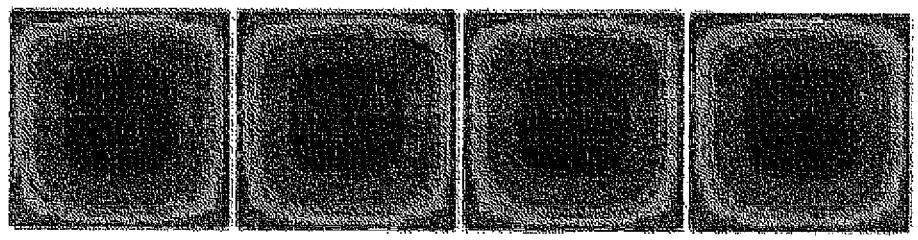
FIG. 7 is a graph of pressure distribution of inner plates of a model of Reference Example 1.
Figure 8:
FIG. 8 is a graph of pressure distribution of an inner plate of a model of Comparative Reference Example 1.

FIG. 8 is a graph of pressure distribution of the inner plate of the model of Comparative Reference Example 1. The graph of FIG. 8 corresponds to the electrode plane 12A shown in the above-described FIG. 9. In FIGS. 8 and 7, which will be described below, sections to which the same level of pressure was applied, are shown as sections in the same dark color. In FIGS. 7 and 8, the section in the darkest color at the central part of each plate, represents the section to which the highest pressure was applied. Also in FIGS. 7 and 8, the color density gradually changes from central part of each plate to the periphery. This change indicates that the applied pressure gradually decreases from the central part of each plate to the periphery.

FIG. 8 shows the pressure distribution of the plate used in Comparative Reference Example 1. As is clear from FIG. 8, the pressure decreases in at least 5 stages from the central part of the plate, to which the highest pressure was applied, to the periphery. The pressure distribution width of the plate used in Comparative Reference Example 1, is as much as 500 MPa between the central part of the plate and the periphery. From this result, the following mechanism is estimated.

As described above, in Comparative Reference Example 1, the simulation of thermally expanding the inner plate while applying the pressure thereto, was carried out. Although the simulation was an isotropic thermal expansion simulation, the pressure applied to the central part of the plate was high, since no room was allowed for the central part to thermally expand. On the other hand, since the periphery of the plate was not covered, the heated plate mainly expanded to the outside in the plane direction (the outer periphery direction), and the pressure was released from the periphery of the plate. As a result, it is estimated that the pressure distribution width of 500 MPa occurred between the central part of the plate and the periphery.

FIG. 7 is a graph of pressure distribution of the inner plates of the model of Reference Example 1. Unlike FIG. 8, FIG. 7 shows the four linearly-aligned plates and the gaps disposed therebetween (a simulation of the slit channels). The graph of FIG. 7 corresponds to the electrode plane 2A shown in the above-described FIG. 2.

As is clear from FIG. 7, the pressure distribution of the four plates of Reference Example 1 gradually decreases in at least 4 stages from the central part of each plate, to which the highest pressure was applied, to the periphery. The pressure distribution width of each plate used in Reference Example 1, is only 250 MPa between the central part of each plate and the periphery. From this result, the following mechanism is estimated.

In Reference Example 1, as with Comparative Reference Example 1, the simulation of thermally expanding the inner plates while applying the pressure thereto, was carried out. However, unlike the model of Comparative Reference Example 1, the model of Reference Example 1 included the four inner square plates and the gaps were disposed between the plates. Since the gaps were sufficiently wide, when the four plates thermally expanded to the outside in the plane direction (the outer periphery direction), there was enough room for the pressure to be released from the periphery of the plates (including the gaps between the plates). That is, compared to the plate of Comparative Reference Example 1, the plates of Reference Example 1 had more room to which the pressure can be released. As a result, it is estimated that the pressure distribution width of only 250 MPa occurred between the central part of the plate and the periphery.

From the comparison between the simulation result of Reference Example 1 and that of Comparative Reference Example 1, it is expected that the all-solid-state battery of the disclosed embodiments, in which the electrode plane of the stack has the long axis direction length and the short axis direction length and has the slit channels, can decrease the pressure distribution width of the electrode plane more than conventional all-solid-state batteries, and the all-solid-state battery of the disclosed embodiments can suppress capacity degradation more than conventional all-solid-state batteries, therefore.

REFERENCE SIGNS LIST

1. Solid electrolyte layer
1*a*. Solid electrolyte cell
2. Cathode layer
2A, 2A'. Cathode plane
2*a*, 2*a*'. Cathode cell
2*b*, 2*b*'. Slit channel in cathode layer
3. Alloy-based anode layer
3A. Anode plane
3*a*. Anode cell
3*b*. Slit channel in alloy-based anode layer
4. Cathode current collector
5. Anode current collector
6, 7. Slit channel
12A. Electrode plane in conventional all-solid-state battery
100A, 100B, 100C, 200. Embodiments of all-solid-state battery
A. Long axis direction length of electrode plane
B. Short axis direction length of electrode plane

The invention claimed is:

1. An all-solid-state battery, comprising
a stack including a cathode layer, a solid electrolyte layer, and an alloy-based anode layer, and
a confining structure that is configured to confine the stack in a direction that makes an angle of 30 degrees or less with respect to a stacking direction,
wherein
the cathode layer has a cathode plane on a side facing the solid electrolyte layer;
the alloy-based anode layer has an anode plane on a side facing the solid electrolyte layer;
the cathode plane and the anode plane have a long axis direction and a short axis direction;
both the cathode plane and the anode plane have one or more slit channels;
the solid electrolyte layer has the one or more slit channels;
at least one of the one or more slit channels penetrate the cathode layer, the solid electrolyte layer and the alloy-based anode layer; and
at least one of the one or more slit channels penetrate only the solid electrolyte layer and the alloy-based anode layer.

2. The all-solid-state battery according to claim 1, wherein
the cathode plane and the anode plane are divided into two or more regions by the one or more slit channels, and
a value obtained by dividing a longest diameter of at least one of the two or more regions by a width thereof, which is perpendicular to the longest diameter, is from 1 to 3.

3. The all-solid-state battery according to claim 2, wherein a shape of at least one of the two or more regions is a square, rectangular, or circular shape.

4. The all-solid-state battery according to claim 1, wherein
the one or more slit channels of the cathode plane have a predetermined width inside the cathode plane,
the predetermined width decreases in a vicinity of an outer periphery of the cathode plane,
the one or more slit channels disappear at the outer periphery of the cathode plane, the cathode plane is divided into two or more regions by the one or more slit channels, and adjacent regions are in contact at the outer periphery of the cathode plane.

5. The all-solid-state battery according to claim 1, wherein the one or more slit channels penetrate the solid electrolyte layer.

6. The all-solid-state battery according to claim 1, wherein at least one of the one or more slit channels in the alloy-based anode layer penetrate only the solid electrolyte layer.

7. The all-solid-state battery according to claim 1, wherein the width of the one or more slit channels is larger than the thickness of the solid electrolyte layer.

* * * * *